United States Patent [19]

Clowers et al.

[11] 3,966,444

[45] June 29, 1976

[54] VACUUM CLEANER FILTER ASSEMBLY

[75] Inventors: Earl R. Clowers; Walter G. Azelkas, both of Anderson, S.C.

[73] Assignee: The Singer Company, New York, N.Y.

[22] Filed: Apr. 4, 1975

[21] Appl. No.: 565,039

[52] U.S. Cl. .................................. 55/356; 15/351; 55/376; 55/378; 55/472
[51] Int. Cl.² ........................................ B01D 46/02
[58] Field of Search ...... 55/368, 356, 370, 374–379, 55/467, 472; 15/327 D, 350, 351

[56] References Cited
UNITED STATES PATENTS

| | | | |
|---|---|---|---|
| 3,184,778 | 5/1965 | Lindberg et al. | 55/378 |
| 3,188,681 | 6/1965 | Jepson et al. | 55/375 |
| 3,667,084 | 6/1972 | Valbona et al. | 15/323 |

FOREIGN PATENTS OR APPLICATIONS

| | | | |
|---|---|---|---|
| 14,303 | 1910 | United Kingdom | 55/374 |

*Primary Examiner*—Bernard Nozick
*Attorney, Agent, or Firm*—Edward L. Bell; Robert E. Smith; Alan Ruderman

[57] ABSTRACT

A lightweight vacuum cleaner having a hollow body with an intake nozzle and a nozzle support tube at one end, a suction creating means removably latched at the other end, and a filter bag assembly positioned in a compartment therebetween. The filter bag assembly includes a sealing and support plate having an integral guide tube for receiving the nozzle support tube through one end and a substantially U-shaped frame. An air permeable filter bag having a neck and a tubular body communicating with the interior of a main bag body is positioned between the legs of the U-shaped frame with the tubular neck removably secured about the guide tube.

2 Claims, 3 Drawing Figures

VACUUM CLEANER FILTER ASSEMBLY

BACKGROUND OF THE INVENTION

This invention relates to lightweight vacuum cleaners and more particularly to a construction for mounting a filter bag in such cleaners.

This invention is an improvement of the vacuum cleaner illustrated in U.S. Pat. No. 3,667,084, now assigned to the assignee of the present application. The mounting of the filter bag illustrated in said patent is similar to that disclosed in U.S. Pat. No. 3,184,778. A disadvantage of this construction is that the filter bag is open at the nozzle end so when a dirty filter bag is replaced, it is very difficult to prevent the dirt from spilling out onto the floor. This problem is particularly emphasized by the fact that in order to remove the filter bag the upper housing is removed and the weight is therefor concentrated at the nozzle end of the lower housing. Thus, if the bag is removed by lifting it out, the dirt will fall back into the lower end, and if the housing is disposed horizontally and the bag thereafter removed, the dirt will spill onto the floor. Only by inverting the lower housing with the nozzle end up, which is particularly awkward, and then removing the filter bag, will substantial spillage of dirt be prevented. However, unless this is done very carefully, some spillage occurs.

SUMMARY OF THE INVENTION

The present invention overcomes these deficiences of the prior art lightweight vacuum cleaners by providing a filter bag mounting assembly having a sealing and support plate including an integral guide tube which receives the nozzle air conduit through the hollow of the tube and which has the inlet neck of a multi-compartment filter bag removably secured about the exterior of the tube.

Accordingly, it is a primary object of the present invention to provide a lightweight vacuum cleaner having a filter bag mounting assembly that eliminates dirt spillage when the filter bag is to be changed.

It is another object of this invention to provide in a lightweight cleaner having suction creating means in an upper housing and inlet nozzle means in a lower housing, a filter bag mounting assembly including a filter bag that may be replaced when full without inverting the cleaner or spilling dirt from the bag.

BRIEF DESCRIPTION OF THE DRAWINGS

These as well as other objects and advantages of the invention will be best understood from the following detailed description of the invention when read together with the accompanying drawings, in which.

DESCRIPTION OF THE PREFERRED EMBODIMENT

Figure 1:
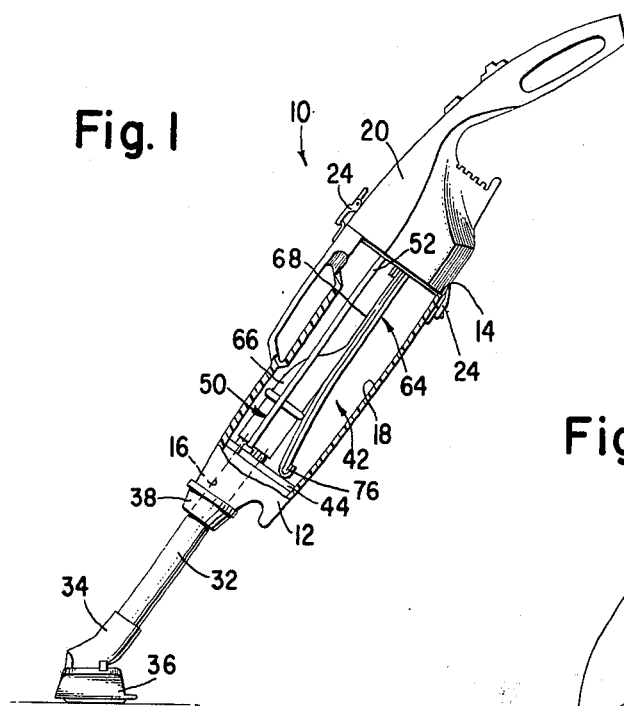
FIG. 1 is a side elevational view, partly cut away and sectioned, of a lightweight cleaner in its normal working position having features constructed in accordance with the present invention.
Figure 3:
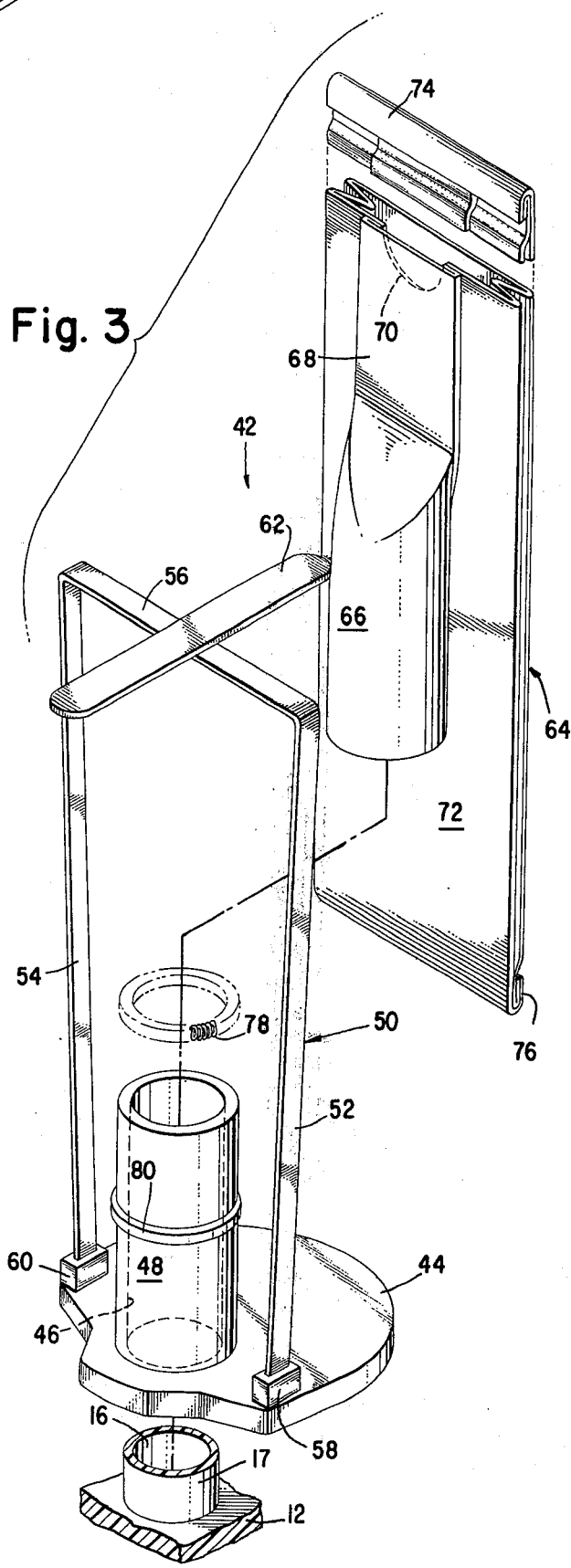
FIG. 3 is a disassembled perspective view of the filter bag mounting assembly of the present invention.
Figure 2:
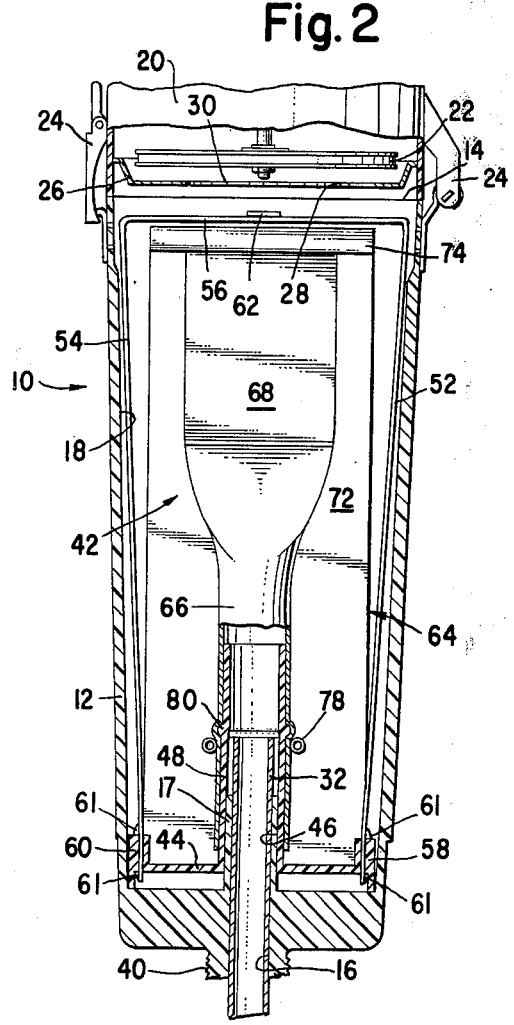
FIG. 2 is an elevational view partly in section of the lower housing and a fragment of the upper housing of the cleaner illustrated in FIG. 1.

Referring now to the drawings, FIG. 1 illustrates a lightweight vacuum cleaner designated generally at 10 of the type illustrated in the aforesaid U.S. Pat. No. 3,557,084, but which incorporates a filter bag mounting assembly constructed in accordance with the principles of the present invention. The cleaner 10 comprises a hollow lower housing 12 having a large open upper end 14 and a smaller opening or aperture 16 in its other end. Formed about the opening 16 on the interior of the housing 12 is a guide hub 17, the purpose of which will hereinafter become clear. The interior of the housing 12 defines a suction and filter bag chamber 18. An upper housing 20, which includes conventional suction creating means comprising a motor (not illustrated) driving a blower impeller 22, is positioned on the upper end of the housing 14 and removably secured thereto by toggle latches 24. A separating disk 26 having an aperture 28 protected by a wire screen is positioned in the housing 20 at the lower housing end of the impeller 22. An air conduit 32 connected at one end by means of a swivel type connector 34 to a floor engaging nozzle 36 is telescopically received at the other end within the opening 16 and the hub 17. The conduit may be adjustably secured within the opening by a gland nut 38 received about a threaded boss 40 formed radially about the hole 16 on the end of the housing 12.

A filter bag assembly generally designated as 42 is received within the hollow of the chamber 18. The assembly comprises a plate 44 having a marginal shape conforming to that of the interior of the housing 12 and of a size so as to fit within the end of the chamber adjacent the opening 16. The plate has an aperture 46 located in registry with the hub 17 and the opening 16 for receiving the hub 17 and thereby the conduit 32. A hollow guide tube 48 is formed integral with the plate 44 about the aperture 46 so that the hollow of the tube 48 is received snugly about the hub 17. The plate 44 is formed of a plastic material and the snug fit ensures that substantially no air flows between the tube 48 of the plate and the hub 17 of the housing so that the plate provides a seal to ensure that substantially no air escapes from the chamber 18 through the inlet end of the lower housing. A substantially U-shaped metal frame member 50 having upstanding legs 52 and 54 and a transverse leg 56 is secured to the plate 44 by means of slotted blocks 58 and 60 molded on the plate 44 to receive upset nubs 61 formed on the ends of the respective legs 52 and 54. A substantially flat narrow metallic cross member 62 may be affixed to the central position of the leg 56 by spot welding. The leg 56 and the cross piece 62 act to ensure that the aperture 28 is free from ingestion of filter bag 64 during operation of the cleaner.

The filter bag 64 is of the multi-compartment porous type such as disclosed in U.S. Pat. of Howard et al. No. 3,619,989 and in U.S. Pat. of Fesco, No. 3,491,522. It includes an inlet tube or neck portion 66 leading to the interior of a first compartment 68 which communicates through a porting 70 adjacent its upper end with a second compartment 72. An air tight folded connection 74 at the upper end of the bag insures that the path of the dirt laden air is from the inlet tube 66 through the port 70 and down the compartment 72. The compartment 72 is closed at the end at 76 so that the dirt is trapped and stored in the bag. The tube 66 of the filter bag is positioned about the guide tube 48 and may be secured in place by, for example, an annular spring 78 positioned on the underside of a circumferential ridge 80 formed on the tube 48 so that the dirt laden air entering the tube 48 from the conduit 32 flows into the tube 66 of the filter.

In use, the filter bag tube 66 is placed about substantially the entire guide tube 48. The spring 78, which is located in the vicinity of the base of the guide tube 48, is thereafter rolled upwardly to the ridge 80 to secure the tube 66. The remainder of the filter bag 64 is then positioned within the legs of the frame 50 and the frame together with the filter bag is inserted into the hollow of the chamber 18 through the open end 14 of housing 12 so that the conduit 32 is received within the guide tube 48. The top housing 20 is thereafter latched to the lower housing 12 and the cleaner is ready for operation. When the filter bag is full, the top housing is removed from the lower housing and the filter assembly is removed by grasping the leg 56 of the wire frame 50. The spring 78 is rolled down off the tube 66 and the filter bag may be removed from the assembly. Since the dirt is in the chamber 72 and cannot fall back into the chamber 68 no dirt escapes from tube 66 to fall into the lower housing or onto the floor.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus described the nature of the invention, what we claim herein is:

1. In a lightweight vacuum cleaner having a hollow lower housing including an aperture at one end and open at the other end, a filter bag compartment defined within said lower housing, an inlet air conduit having a nozzle at one end, means for securing the conduit to the lower housing with its other end positioned within the aperture, and an upper housing having suction creating means removably secured to the open end of the lower housing with said suction creating means communicating with said filter bag compartment, an improved filter assembly comprising: a support plate including an integral open ended guide tube positioned in said compartment, said guide tube extending from a face of the plate toward the open end of the lower housing and in flow communication registration with said aperture, said plate having a marginal border conforming in size and shape to that of the lower housing at the aperture end, said guide tube being positioned about said other end of the intake air conduit, a frame having elongated legs secured to said plate and extending toward the open end of the lower housing, said frame including a grasping member at the upper extremity of said legs, a porous filter bag having at least two interior compartments, one compartment including a tubular inlet portion receivable about said guide tube, a second compartment having an opening communicating with the first compartment remote from the tubular portion and having a dirt storage cavity remote from the opening, and means for removable securing said tubular inlet portion about said guide tube, said assembly being removable as a unit from the open end of the lower housing.

2. In a lightweight vacuum cleaner as recited in claim 1 wherein said lower housing includes a guide hub formed about said aperture, said hub being snugly received within said guide tube to provide a seal therebetween, said air conduit being received within said hub.

* * * * *

UNITED STATES PATENT OFFICE
CERTIFICATE OF CORRECTION

PATENT NO. : 3,966,444

DATED : June 29, 1976

INVENTOR(S) : Earl R. Clowers; Walter G. Azelkas

It is certified that error appears in the above-identified patent and that said Letters Patent are hereby corrected as shown below:

Column 4, line 11 delete "registration"

Signed and Sealed this

Nineteenth Day of October 1976

[SEAL]

Attest:

RUTH C. MASON
Attesting Officer

C. MARSHALL DANN
Commissioner of Patents and Trademarks